(12) United States Patent
Hälg et al.

(10) Patent No.: US 6,926,949 B1
(45) Date of Patent: Aug. 9, 2005

(54) HEAT-ACTIVATABLE MODULAR STRUCTURAL MEMBER, ITS USE AND PROCESS FOR THE DIRECT GLAZING OF VEHICLES AND ADHESIVE THEREFOR

(75) Inventors: Paul Hälg, Richterswil (CH); Udo Buchholz, Wilen/Wollerau (CH); Paul Rohrer, Herrliberg (CH); Curtis L. Volkmann, Brighton, MI (US); Ulrich Tribelhorn, Ebikon (CH)

(73) Assignee: Essex Specialty Products, Inc., Clifton, NJ (US)

( * ) Notice: Subject to any disclaimer, the term of this patent is extended or adjusted under 35 U.S.C. 154(b) by 0 days.

(21) Appl. No.: 08/318,702

(22) PCT Filed: Feb. 10, 1994

(86) PCT No.: PCT/CH94/00027

§ 371 (c)(1),
(2), (4) Date: Oct. 11, 1994

(87) PCT Pub. No.: WO94/18255

PCT Pub. Date: Aug. 18, 1994

(30) Foreign Application Priority Data

Feb. 12, 1993 (CH) .............................. 00435/93
Feb. 8, 1994 (CH) .............................. 00354/94

(51) Int. Cl.$^7$ .............................................. B32B 27/40
(52) U.S. Cl. ................ 428/192; 428/449; 428/355 AK
(58) Field of Search ................................ 428/192, 349, 428/355 AK, 141, 143, 144, 147, 194, 195; 528/45, 61, 65, 905; 156/331.4, 331.7

(56) References Cited

U.S. PATENT DOCUMENTS

| | | | | |
|---|---|---|---|---|
| 3,879,241 A | | 4/1975 | Butler ......................... 156/275 |
| 3,933,759 A | * | 1/1976 | Hoeschele ............ 260/77.5 TB |
| 4,400,497 A | | 8/1983 | Blum et al. ..................... 528/45 |
| 4,483,974 A | | 11/1984 | Grögler et al. ................ 528/68 |
| 4,551,372 A | | 11/1985 | Kunert ......................... 428/38 |
| 4,571,278 A | | 2/1986 | Kunert ......................... 428/38 |
| 4,581,276 A | | 4/1986 | Kunert et al. ................. 428/157 |
| 4,595,445 A | | 6/1986 | Hombach et al. ......... 156/307.3 |
| 4,606,159 A | | 8/1986 | Kunert ......................... 52/208 |
| 4,667,008 A | | 5/1987 | Grögler et al. ................ 528/67 |
| 4,681,794 A | | 7/1987 | Kunert et al. ................ 428/188 |
| 4,879,853 A | | 11/1989 | Braendle et al. ............... 52/208 |
| 4,910,071 A | * | 3/1990 | Kunert ......................... 428/192 |
| 4,933,032 A | * | 6/1990 | Kunert ......................... 156/108 |
| 4,944,984 A | * | 7/1990 | Kunert ......................... 428/83 |
| 4,986,867 A | * | 1/1991 | Braendle et al. ......... 156/244.11 |
| 4,994,315 A | * | 2/1991 | Schreiber et al. .............. 428/76 |
| 5,062,248 A | * | 11/1991 | Kunert ......................... 52/208 |
| 5,063,269 A | * | 11/1991 | Hung ......................... 524/296 |
| 5,082,736 A | * | 1/1992 | Bravet et al. ................ 428/192 |
| 5,100,995 A | * | 3/1992 | Munzmay et al. ............. 528/45 |
| 5,137,770 A | * | 8/1992 | Rothe et al. ................. 264/252 |
| 5,273,704 A | * | 12/1993 | Scholl et al. ................ 264/252 |
| 5,279,082 A | * | 1/1994 | Scholta ......................... 52/610 |

FOREIGN PATENT DOCUMENTS

EP 603046 A1 12/1993
EP 603047 A1 12/1993

OTHER PUBLICATIONS

Backus et al. "Polyurethanes" Encyclopedia of Polymer Science and Engineering, vol. 13, 243–303, 1985.*
U.S. application Ser. No. 08/261,362, filed Jun. 16, 1994, which is a continuation–in–part of U.S. application Ser. No. 08/090,360, filed Jul. 12, 1993.

* cited by examiner

Primary Examiner—D. Lawrence Tarazano

(57) ABSTRACT

The storable modular component, especially a storable glass module, is prepared for assembly by gluing to another component without using an additional assembly glue. Along its edge it displays a profiled bead of a latent reactive adhesive which includes predominantly one or more polyurethanes with blocked isocyanate groups, or one or more polyurethane preproducts consisting of polyols and/or polyamines and encapsuled polyisocyanates, or one or more polyurethanes with radically polymerizable groups. In this case the reaction of the adhesive can be initiated at an activation temperature of 70 to 180° C. At the same time, it remains tacky and nonflowing but plastically deformable for a time sufficient for assembly. The stated materials are capable of being activated by being supplied with electrical, electromagnetic or magnetic energy or by infrared radiation. The adhesive may contain magnetizable and/or electrically conductive fillers. The glass module is used for direct glazing of vehicles, especially automobiles.

11 Claims, No Drawings

HEAT-ACTIVATABLE MODULAR STRUCTURAL MEMBER, ITS USE AND PROCESS FOR THE DIRECT GLAZING OF VEHICLES AND ADHESIVE THEREFOR

The invention concerns a heat activated modular component that is prepared for assembly by gluing to another component without using an assembly glue characterized by the fact that a profiled strip of adhesive of a latently reactive adhesive is placed along its edge which consists predominantly of one or more polyurethanes with blocked isocyanate groups, or one or more polyurethane preproducts consisting of polyols and/or polyamines and encapsuled polyisocyanates, or one or more polyurethanes with radically polymerizable groups, in which the reaction is initiated at an activation temperature of 70 to 180° C. and which simultaneously remains tacky and non-flowing but plastically deformable for a time sufficient for assembly.

From the publications EP-B1-0 345 134, EP-B1-0 312 296 and EP-B1-0 351 369 prefabricated vehicle windows are already known for direct glazing by gluing into a frame, flange or the like which along their edge display a first trough-profiled adhesive strip which is elastically but not plastically deformable and which is provided with a second adhesive strip, possibly covered by a protective shell and/or capable of being activated, of a material chemically compatible with the first adhesive strip. Such prefabricated vehicle windows can be used as a ready-to install-component for gluing into vehicle bodies without using an additional assembly glue.

In this case the preparation of the vehicle window is performed separately in time and space from the actual installation of the window. In other words, the pane of glass can be prepared as a ready to install independent component in an optimized environment with ideal timing and under the best conditions to such an extent that it is necessary only to remove the protective shell has to be removed and/or to activate the second adhesive.

Suitable materials for the second adhesive strip named there are:

(a) oxidatively hardening adhesive substances

These must be stored with exclusion of air and oxygen and therefore modules absolutely require a protective foil or protective shell.

(b) Moisture-reactive adhesives

These must be stored under exclusion of moisture and therefore also absolutely require a protective foil or protective shell.

(c) Thermoplastic adhesives

The classical melting adhesives called "hot melts" are solid at room temperature and when warmed to a certain temperature generally lying above 150° C. they become paste-like. A covering by a protective foil or protective shell is not absolutely necessary here, except possibly to protect against soiling and mechanical damage. In order to arrive at satisfactory thermal stability, such products for the auto industry must have a softening point above 120° C. Such nonreactive adhesives are not used for structural joints and for gluing safety parts in vehicle construction.

(d) Thermosetting adhesives

These differ from the thermoplastic adhesives mentioned under (c) in the fact that at a certain critical temperature $T_k$ they are irreversibly cured or hardened. Therefore when the second adhesive strip is applied to the first adhesive strip they can only be warmed up to a certain first transition temperature $T_1$ lying below the critical temperature $T_k$. Such products are available but they are either moisture-sensitive and require a covering foil or else they must be held at the curing temperature until they are totally cured.

(e) Slow reacting two-component systems

By a suitable choice of chemical composition these systems can be adjusted to a suitable open time. Here also a covering with a protective foil or protective shell is not absolutely necessary. However, these systems are very long in curing and require long fixation after installation.

All of the solutions named except variant (c) share the feature that the second adhesive partial strip requires shielding of the first trough-shaped cured partial strip. In addition the trough shape fast hardening adhesive partial strip must be selected such that the diffusion of moisture through the material is practically zero in order to achieve a storage capacity of more than a few days. This limits the possibilities of the choice of material greatly so that the moisture-hardening polyurethanes in particular may not be used.

The use of covering foils or protective shells such as is necessary in the above mentioned publications is problematic in two respects. First, it is difficult to seal the coverings against the trough-shaped partial strip, especially in the curved areas. Second, the covering material is an undesired waste product which must be collected and recycled.

In Table 1 typical guideline values for the most important properties of some of the materials named in the publications cited are given.

TABLE 1

| Substance group | Storage tine | Activation | Open time |
| --- | --- | --- | --- |
| (a) | 2 to 6 months | O₂ contact after removal of protective foil | 10 to 30 min |
| (b) | 30 min to 2 weeks | air humidity after removal of protective foil | 10 to 30 min |
| (c) | 6 to 12 months | heat | 5 sec. to 1 min |
| (d) | 6 to 12 months | heat after removal of protect foil | 20 sec. to 3 min |
| (e) | 30 to 180 min | — | 30 to 240 min |

In the meanwhile, however, requirements have been imposed on the automobile industry which cannot be satisfied by the above-mentioned substance group. The increasing automation on the assembly line requires a reduction in assembly line components by modulization, i.e. previous assembly of modules in special preassembly islands or preferably by the supplier. Since this solution also entails indirect advantages in administration and logistics not to mention waste disposal costs, it is expected to spread to other branches of industry also. In the case of direct glazing the elimination of machines such as pumps and robots or the reduction in their number also signifies a saving of space and a reduction of the risks related to the use of chemicals. However, on the other hand, it also means that such prefabricated modules are generally stable over a sufficiently long storage and transportation time of 1 to 3 months. In addition solutions which require special packages and which cause waste products or recycling operations are less desired.

In addition, cycle times are demanded which are far below the cycle times that are realizable with the above mentioned substance groups. In particular cycle times of less than 50 s are required within which such a module is made capable of being glued and installed. Furthermore, the assembly should be possible without conventional aids such as intermediate parts, spacers, adhesive tapes etc. which previously were used to prevent slipping.

In the rest of industry also the need exists for a jointing system by structural gluing of component parts in which the adhesive is already preapplied to the joint partners which, on the one hand, is capable of storage and transportations, but on the other can be joined within short assembly cycles and can subsequently be worked further as a whole without a waiting period.

The purpose of the invention was now to create a storable heat activatable modular structural component and a process for gluing a modular component to another component, especially for direct glazing of vehicles, which satisfies these requirements.

This problem is solved by a storable modular component according to the invention by the fact that it displays along its edge a profiled adhesive strip of a latent reactive adhesive which consists predominantly of:

one or more polyurethanes with blocked isocyanate groups, or one or more polyurethane preproducts which consists of polyols and/or polyamines and of encapsuled polyisocyanates, or one or more polyurethanes with radically polymerizable groups, in which the reaction can be initiated at an activation temperature of 70 to 90° C., and which simultaneously remains tacky and nonflowing but plastically deformable for a time sufficient for assembly.

In another embodiment the invention is a storable glass module for direct glazing of vehicles which is prepared for gluing into a frame or flange without using an assembly glue and which displays along its edge a profiled strip of adhesive lying directly on the glass pane or on a separate intermediate support characterized by the fact that the adhesive strip consists of a material which is nontacky and is latently reactive and consists of one or more polyurethanes or polyurethane preproducts described above of which at least one is constructed from a crystalline polyol.

The process according to the invention for direct glazing of vehicles is characterized by the fact that one applies:

along the edge of the modular component a profiled adhesive strip of a latently reactive adhesive consisting predominantly of:

one or more polyurethanes with blocked isocyanate groups, one or more polyurethane-preproducts consisting of polyols and/or polyamines and of encapsuled polyisocyanates, or or or more polyurethanes with radically polymerizable groups, in the soft state;

the adhesive strip, if necessary after heating to its activation temperature of 70 to 180° C. along its contact surface with the modular component is allowed to harden in order to bring it to reaction, the thus obtained storable modular component, if necessary after intermediate storage, is transported to an assembly line, if necessary, the uncured parts of the adhesive are brought to react at least along the contact area with the modular component by rapid heating to an activation temperature of 70 to 180° C. and the non-pressure-deformable part of the adhesive is made plastically deformable but non-flowing over the entire cross-section, the modular component is brought together with the other component to which it is to be glued, pressed together at a preassigned joining distance, if necessary the still unactivated part of the adhesive is rapidly heated to the activation temperature of 70 to 180° C. for initiation of the reaction and the joint immobilized at least until the adhesive has set and then allows to finish reacting without taking further action, with the qualification that the difference between the application temperature and the activation temperature of the adhesives is at least 20° C.

According to a preferred version the adhesive along its contact surface with the modular component may already be brought to reaction following application of the bead of adhesive by exposure to heat, more particularly the adhesive is already cured along its contact surface with the modular component. Preferably, the softening point of the adhesive is 25 to 80° C., preferably 35 to 60° C. Preferably, the activation temperature of the adhesive is 70 to 150° C., preferably 80 to 120° C.

This has the advantage that the bonding of the adhesive to its support is already assured upon arrival at the assembly site. In this way in the case when the adhesive becomes plastically deformable, a pretreatment of the component before installation may be entirely omitted. If the adhesive melts at temperatures above 35° C., in this case warming of the still uncured part of the adhesive to a temperature above its melting point is sufficient.

The latently reactive adhesives used according to the invention in a preferred version contain one or more polyurethane prepolymers with blocked isocyanate groups or radically polymerizable groups or polyols, polyamines and encapsuled polyisocyanates where at least one of the components of the adhesive is crystallizing and the mixture for the overwhelming part melts between 25 and 80° C., preferably between 35 and 60° C. Preferably, the adhesive consists predominantly of one or more polyurethanes with acrylate or methacrylate end groups and contains the additive necessary for initiation and control of the radical polymerization.

Preferably, the adhesive is solid at room temperature. Preferably, a maximum of 20 weight percent, preferably 5 to 15 weight percent of the polyols serving to construct the polyurethanes are polyester polyols, while the remainder are polyether polyols. In another embodiment, the adhesive is a hot melt adhesive with a softening point above 80° C. The difference between the softening point and the activation temperature is at least 20° C., preferable at least 30° C. Preferably, the modular component is capable of being stored under ambient conditions below 30° C. for at least 14 days, preferably for at least 2 months.

In another variant a mixture of noncrystallizing polyurethane prepolymers and crystallizing polyurethane prepolymers or a mixture of noncrystallizing and crystallizing polymeric polyols are used in combination with polyamines and encapsuled isocyanates. In this case the two types of polyurethane prepolymers may also be combined in a copolymer with crystallizing and noncrystallizing molecule parts. As the crystallizing components, for example, one may use the reaction products of diisocyanates with crystallizing polyether polyols such as polytetrahydrofuran, polyethylene glycol, with crystallizing polycarbonate polyols, as well as those obtained by reaction of 1,4-butanediol with diarylcarbonates, e.g. diphenylcarbonates or phosgene.

Other examples of crystallizing components are the polyester polyols such as polycaprolactone or butanediol-adipic acid-hexanediol polycondensates or polyesteramide polyols which are obtainable, e.g. by reaction of a carbonylterminated polyamide oligomer with hydroxyl-terminated polyethylene terephthalate oligomers or the reaction products of said polyols with diisocyanates.

As crystallizing components in addition one may also use nonreactive substances such as solid softeners, e.g. stearates or hydrogenated ricinus oil or its derivatives.

Another possibility consists in mixing thermoplastics into the latent reacted polyurethane prepolymer. Examples of such thermoplastics are ethylene-acrylate copolymers, ethylene-acrylic acid copolymers, ethylene-vinyl acetate copolymers and thermo-plastic polyurethanes.

Another group of crystallizing components is the reaction products of diisocyanates with short-chained diols, which form hard segments. As protective groups for blocking the isocyanate groups of the prepolymer, in principle, H-active compounds may be used which can be split off again below the temperature of the polyurethanes. Oximes, phenols and lactams are especially suitable with blocked phenol, ketoxime or epsilon-caprolactam compounds being more preferred.

Depending on the blocking group it may be necessary, in order to lower the deblocking temperatures, to add catalysts. Suitable catalysts are organometal catalysts such as dibutyltin dilaurate (DBTL), metal salts and organic acids of the tertiary amines such as triethylenediamine. In this case to lengthen the storage capacity of the latently reactive hot melt adhesives it is desirable to use amine catalysts in the form of their salts with organic acids.

The adhesives according to the invention may additionally contain low molecular polyfunctional compounds such as polyols, e.g. trimethylolpropane or polyamines such as diethyltoluene diamine for partial pre-crosslinking of the hot adhesives during activation. Instead of these polyfunctional compounds one may use latent amine hardeners such as dicyanodiamide, phthalic acid anhydride-amine adducts, methylene dianiline salt complexes or other latent hardeners such as are known to the expert.

Instead of polyurethanes with block isocyanate groups, according to the invention, polyurethane preproducts may also be used whose polyisocyanates are low molecular solid compounds which are protected by a shell of urea and cannot react at room temperature with the H-active compounds. As H-active compounds one preferably uses macromolecular polyols and/or polyamines and possible additionally low molecular diols and/or aromatic di-amines as chain lengtheners. Alternatively, polyurethane prepolymers with hydroxyl or aromatic amine end groups may be used in combination with the blocked polyisocyanate.

The blocking of the isocyanates is preferably achieved with aliphatic primary or secondary amines such as are described in the publication EP-B1-0 062 780.

Upon activation of the adhesive by heat, the urea shell is destroyed by this and the polyisocyanate liberated. The latter reacts immediately with the H-active compounds. Suitable solid polyisocyanates are, for example, dimeric 4,4'-diisocyanato-diphenyl methane, 3,3'-diisocyanato-4,4'-dimethyl-N,N'-diphenyl-urea, trimetric isophoron diisocyanate or 1,4-phenylene diisocyanate. If polyurethane prepolymers with hydroxyl end groups are used as the H-active compounds, then by the proper choice of the functionality and reactivity it is possible upon heat activation to obtain the corresponding prepolymers with free isocyanate end groups which subsequently react with air humidity and crosslink the polyurethanes.

Another preferred version of the latently reactive adhesives is based on polyurethanes whose chain ends display radically polymerizable groups. Such groups are preferably acrylate or methacrylate groups such as can be obtained by reacting isocyanate functional prepolymers with OH functional acrylates or methacrylates, e.g. 2-hydroxyethylacrylate or 3-hydropropylacrylate or by reacting OH or NH functional prepolymers with isocyanatoacrylates or methacylates.

In this variant the adhesives are activated along the contact surface with the support module upon application of the adhesive bead or before the joining of the module by exposure to heat.

The adhesive may additionally contain organometal compounds or tertiary amines as catalysts. The adhesive may contain softeners (plasticizers), thixotropic agents and/or fillers. The adhesive may contain magnetizable and/or electrically conducting fillers. The adhesive may contain 2 to 20 weight percent, preferably 5 to 15 weight percent gamma ion oxide.

In a preferred embodiment at least one black essentially light impermeable coating is arranged between the glass and the adhesive bead. Preferably, the black coating contains pigments or other fillers which liberate heat in an electrical, electromagnetic or magnetic field.

Preferably, the adhesive before application is heated to a temperature of 35 to 60° C. and that the profiled adhesive bead is not deformed after it solidifies when handled. The adhesive can be conveyed without a heated vat pump at room temperature lying above 10° C. and before discharge as a bead is warmed to a temperature of 35 to 60° C., preferably 40 to 50° C. Preferably, the adhesive is applied through a nozzle or by doctor blade.

In that version of the invention which envisions the pre-hardening of the adhesive along its contact surface with the support, the duration and intensity of heat exposure is selected such that the thickness of the cured layer is less than the intended minimum thickness of the adhesive joint to be formed after joining. Preferably the cured layer thus formed is not significantly thinner, because thus after joining the remaining part still to be cured of the adhesive is minimal. In this case the curing after assembly is possible by heat conduction from the hot joint partner even in the case of thick adhesive joints.

The above mentioned adhesive materials for adhesive strips have a number of advantages compared to the known materials:

Under ambient conditions they are capable of being stored for up to 3 months without the need for special protective measures such as covering foils or lacquer films. Nevertheless they can be activated within a few seconds to a few minutes.

The above mentioned materials according to a preferred version are already soft and tacky above 35° C. and therefore capable of forming a joint. At the same time at room temperature they are essentially solid and do not deform when handled.

Preferred materials are capable of being pumped already at a temperature $T_p$ of 50 to 60° C. and display a first transition point $t_1$ from 40 to 50° C.

The activation and the initiation of crosslinking in a preferred version is already achieved at a temperature $T_k$ of 80° C. so that a rapid and unproblematic activation is possible.

Said materials may be pumped from a supply container to the applicator, e.g. a nozzle or a doctor blade without starting the activation and without noticeably aging.

Said materials, in a preferred version, after application rapidly return to a state in which they are dry and touchable. As a result a rapid rhythmical production of precoated modules is possible.

Said materials can be heated to the activation temperature without losing their shape.

The activation and, if necessary, the partial crosslinking can be initiated within 2 minutes, preferably within 1 minute, in an especially preferred version, even within 30 seconds, and the curing continues beyond assembly. Such short activation and reaction times are to be had when polyurethane preproducts are used in combination with encapsuled solid polyisocyanates. Simultaneously with activation the adhesive in brought into a plastic form. During installation and subsequent fixation the adhesive hardens again so that the glass pane is firmly seated without slipping or springing back.

Said materials can be activated by the introduction of electrical, electromagnetic, or magnetic energy and softened at the same time without the occurrence of local overheating.

In a preferred version using blocked isocyanate prepolymers or encapsuled isocyanates the above mentioned materials display enough active isocyanate groups to anchor themselves to the substrates to be glued, especially a lacquered substrate and to build up an aging-resistant joint.

In another version which permits especially simple activation the adhesive is activated only along its contact surface with its support.

In order to activate the glass module according to the invention, in principle, any form of heat may be used. However, heating in a conventional convection oven is not suitable for reaching a rapid integral heating of the latently reactive adhesive. Following this, therefore the glass itself and a possible border frame are jointly warmed to the same extent, which for the case that immediate adhesion is achieved after assembly by cooling and crystallization of the adhesive, is obstructive to rapid adhesion after assembly without additional reinforcement. However, if the adhesive bead along its contact surface with the support module has already been activated, then air with a temperature below the activation temperature is suitable for melting the remaining adhesive.

In the case when infrared radiators are used it is possible to achieve a rapid and specific heating of the adhesives from the surface. However, the problem is that the surface is slightly overheated before the base of the plastic bead reaches the necessary activation temperature.

In one embodiment on the assembly line the adhesive is brought to reaction rapidly along the contact surface by infrared rays passing through the glass pane and is made plastically deformable over its entire cross section.

On the other hand, infrared radiation is very well suited for activating the base of the adhesive along its surface with the support. In this case the modular component is irradiated from the back side. This is advantageous especially for glass modules where the thermal radiation penetrates the glass practically without obstacle and heats the adhesive on its contact surface or interface with the glass. Although an intermediate layer is present between the adhesive and the glass surface, especially the customary black enamel paint and possibly a black primer for masking and protecting the adhesive interface against damaging ultraviolet radiation and under some conditions a profiled plastic mass for holding the glass edge, this method permits a rapid and specific heating of the adhesive without significantly heating the glass support.

A modification of this method consists in using, instead of infrared radiators, a beam-expanded relatively long wave laser, e.g. an Nd-YAG laser which drives the contact surface toward the glass from the back side of the glass.

The heating with infrared radiation, especially with bright radiation, is well suited for activating the adhesive only after assembly or the joining of the modular components according to the invention even if the latter has not yet cured on its contact surface on the support. This is especially the case when a glass module is involved, and the method is especially effective if the joint partner consists of a fully heat conducting material, especially of plastic.

It has been found that electrical, electromagnetic or magnetic energy can be used advantageously for the integral activation of the adhesive strip. By allowing this form of energy to act specifically on the mass of the adhesive bead, it is possible, if the process is properly conducted, to heat the adhesive to the activation temperature in times of less than 30 seconds without the disturbing manifestation of the problems mentioned above in connection with the other heating methods.

Preferably, the adhesive contains ferromagnetic and/or electrically conducting filler. On the assembly line it is heated in the alternating magnetic field at 10 to 1,000 kHz, preferably at 100 to 500 kHz.

In the range of electromagnetic energy from 1 to 1000 kHz, magnetic induction is the preferred heating source. This source of energy is already used in the automobile industry for direct heating of two-shell steel components such as doors or engine hoods, for gluing reinforcing parts to the outer shells. To be sure in such cases the adhesive itself is heated only indirectly by thermal conduction through the steel parts. If the adhesive itself is warmed, then magnetizable and/or electrically conducting fillers must be contained in it which emit or release their heat to the matrix. A good description of the mechanism of heating and the fillers suitable for this application is to be found in A. Goldman, Modern Ferrite Technology, Van Nostrand Reinhold, New York (1990).

Preferred fillers are magnetizable iron oxides such as ferrites, magnetites, gamma iron oxides which are available on the market in very fine grain sizes. Even at relative weight portions of less than 15 wt. % these permit heating up to 150° C. in less than 30 s. However, it is also possible in principle to use electrically conductive fillers such as iron powders or steel fibers.

When heated in the high frequency (HF) or in the radio frequency (RF) field in the range from 1 to 300 MHz one is limited to the internationally established frequencies for industrial applications (see Table 2). Besides this, as opposed to magnetic induction, a special screening of the radiation zone against the environment may be necessary.

TABLE 2

Industrially useful frequencies in the
RF and MW range (status February 1993).

| RF (radio frequencies) | |
|---|---|
| 13.56 MHz ± 0.05% | 27.12 MHz ± 0.6% |
| 40.68 MHz ± 0.05% | |
| MW (microwaves) | |
| 433 MHz | 416 MHz |
| 850 MHz | 915 MHz |
| 2.4 to 2.5 GHz | 5.725 to 5.875 GHz |
| 24 to 24.250 GHz | 61 to 61.5 GHz |
| 122 to 123 GHz | 244 to 246 GHz |

With this technique the dipoles of the adhesive molecules are excited directly to rotation, and through the corresponding dielectric losses, the matrix is heated up. The adhesive for this purpose is brought into the interior of the variable electromagnetic field which is built up between two electrodes adapted to the shape of the adhesive strip. With this method it is also possible to heat the adhesive bead up to 150° C. in less than 30 seconds.

Another variant of fast deep-acting energy introduction is microwave. Preferably, the heating of the adhesive by microwave radiation takes place in an electromagnetically shielded room, where the microwaves are coupled in a resonance oscillation circuit mounted over the cross section of the adhesive bead that is automatically tuned to the mass of the adhesive bead that is automatically tuned to the mass of the adhesive. Process as characterized by the fact that the adhesive contains electrically conductive fillers and that is heated on the assembly line by being wired as an ohmic resistance with direct or alternating current. The permissible wavebands are listed in Table 2. The energy in this case is fed from a transmitter through a waveguide into a resonance-oscillation circuit mounted over the cross section of the adhesive strip. At this time the oscillation circuit must to tuned to the mass of the adhesive strip in such a way that standing waves are not formed in order to assure uniform heating of the bead over the entire module surface.

The microwave energy in the electromagnetic range from 0.3 to 5 GHz also acts directly on the macromolecules of the adhesive by dipole excitation and dielectric losses. It is also possible to accelerate the warming through conductive fillers such as soot or polar fillers. Thus with this technique a temperature of over 150° C. can also be reached in 30 seconds. This technique requires a careful screening of the workroom from the outside, because microwave radiation is dangerous for the human organism. In order better to control the heating in the microwave field it may be helpful to introduce the energy in a pulsating mode.

Other principles of this technique are found in: G. Nimitz, Microwaves, Wissenschaftsverlag, Zurich (1990).

Another suitable form of energy for rapid mass-active heating for activation of the hot melt adhesive is to hook up the adhesive strip that has been made conductive to a DC or AC voltage source. With conductive fillers, it is known, the conductivity of organic materials can be increased by several powers of 10. For this purpose frequently conductive fillers such as soot, graphite, metal flakes etc. are used. Especially suitable for the present invention are fibrous conductive fillers such as steel fibers which can raise the conductivity by up to factor of $10^5$. In this way it becomes possible by mixing in fillers of this type in in the range 5 to 10 wt. %, to produce products which, when the module is connected to a grid voltage source, heat it up to 150° C. in less than in 30 seconds.

In order to achieve a uniform distribution of the heat in the case of electric, electromagnetic, or magnetic heating of the hot melt adhesive bead it may be advisable if the coating normally applied over the edge zone directly on the glass which serves for optic masking or for protection of the adhesive bead, contains pigments which liberate heat under the influence of the above mentioned heating methods, e.g. metal oxides. Alternatively a primer which contains pigments such as soot may also be used. In order to concentrate the energy on the adhesive bead and to minimize the heating of other elements that are located on the glass module such as radio antennas or heating systems, it is desirable to focus the electromagnetic or magnetic field of the adhesive bead. In addition or alternatively conductive coverings can shield against undesired heating.

According to a preferred version the adhesive strip is not totally activated before installation but only along its contact surface with the glass, i.e. to a layer thickness that is less than the nominal or minimal thickness of the adhesive after joining. In this case the still unactivated part of the adhesive which in contact with the joint partner is activated after joining. This can be done by heating the above mentioned inactive part of the adhesive strip by direct exposure to heat, e.g. hot air, above the activation temperature. However, this method is less well suited if the joining partner is strongly heat conducting and has a high mass. In this case it may be difficult to activate the interface with the joint partner and to achieve a permanent adhesive bond with it.

A preferred method is to heat the joint partner at its contact point with the adhesive in such a way that the adhesive is heated and activated by heat conduction from the joint partner. If the joint partner displays generally or over the region of its joint zone a heat capacity sufficient to warm the remaining still inactive adhesive mass above the activation temperature it is possible to heat the joint partner before joining to a temperature sufficiently above the activation temperature. In this case, however, one must make certain to remain sufficiently below the decomposition temperature of the adhesive.

If the joint partner consists of a ferromagnetic metal, inductive heating via a magnetic induction field in the range from 1 to 1000 kHz it is recommended as an extremely fast heating method. This method is especially well suited for the installation of components, especially of permanently glazed window panes, in vehicle bodies. In this case the flange is heated just before assembly or immediately after assembly of the window through the glass with an induction loop running parallel to the flange. During the inductive heating the supply of energy is regulated by a closed regulating circuit in such a way that the temperature remains sufficiently below the decomposition point of the adhesive or of the enamel.

Metallic joint partners, however, can also be heated by electrical resistance heating, radiation heat or heat conduction.

Nonmetallic joint partners, e.g. plastics, can be heated well by infrared radiation, hot air or heat conduction. In this case, however, it is also possible by applying a high frequency field to heat the adhesive and if necessary the joint partner directly over the region of the entire adhesive joint. Alternatively one can also work with a high frequency magnetic field, in which case the adhesive must contain electrically conducting or magnetizable fillers.

As mentioned above, the process according to the invention is especially advantageous for use in vehicle assembly, since it permits the production of transportable and ready-to-glue components under optimal production conditions which require only heat activation in order to make rapid assembly and practically immediately loadable gluing possible.

After the glass module is applied to the vehicle frame or flange, the sheet metal, the adhesive can be inductively heated from the application side along the vehicle frame or flange and thus the still unactivated part of the adhesive is caused to react by heat conduction. The other component to be joined to the modular component can be preheated to a temperature above the activation temperature and that after they are joined together, through the heat flux from the other component the still unactivated part of the adhesive is brought to reaction.

In Table 3 possible and especially preferred process variants made possible by the present invention are compared.

Table 4 shows by the example of direct glazing, of an auto with glass modules according to the invention two versions with typical cycle times.

TABLE 3

Process variants for the modular component

| Module/joint partner | Activation 1 during production of component | Activation 2 on the assembly line before installation | Melting on the assembly line | Residual activation |
|---|---|---|---|---|
| 1. Glass/steel | Heating of contact area with support, e.g. with IR/laser | None | Heating before installation, e.g. with hot air | After installation by heating of flange, e.g. induction |
| 2. Glass/steel | None | Heating the entire bead, e.g. with induction (poss. combined with IR heating of contact area) | With activation | Not necessary |
| 3. Glass/steel | Heating of contact area with support as in 1. | None | Plastically deformable at room temperature | After installation by heating the flange, e.g. by induction |
| 4. Glass/SMC* | None | Heating of contact area with support e.g. with IR/laser | By heat conduction from contact area during activation | Immediately before induction by heating the joint partner |
| 5. SMC*/steel | Heating of contact area with support, e.g. by IR | None | By hot air | After installation by heating the joint partner, e.g. by resistance heating |
| 6. Glass/steel | None | Heating of contact area with support, e.g. by IR/laser | By heat conduction from contact area during activation | After installation by heating the flange by induction through glass |
| 7. Noryl**/ Noryl** | None | None | Plastically deformable at room temperature | After joining by applying HF field over both joint partners |
| 8. Glass/steel | None | None | Plastically deformable at room temperature | After installation by heating the adhesive with IR/laser through glass |

*SMC = Sheet molding compound (not injectable)
*Noryl GTX by General Electric (a thermoplastic)

TABLE 4

Typical cycle times of the process according to the invention with a glass module and an adhesive bead solid at room temperature.

|  | I. With cured contact area with glass up to 2 mm thick (seconds) | II. Without pre-activation (seconds) |
|---|---|---|
| Positioning of glass module along conveyer belt triggered by removal of previous module | 2 | 2 |
| A. Prescribed operations (advance times) |  |  |
| Transfer of glass module from conveyer belt to activation station by a manipulator triggered by the contact of the body in the previous installation station (with a variable time delay) |  | 7 |
| Blocking the activation station, heating and activation along the glass surface, unlocking triggered by positioning of the module in the activation station |  | 25 |

TABLE 4-continued

Typical cycle times of the process according to the invention with a glass module and an adhesive bead solid at room temperature.

|  | I. With cured contact area with glass up to 2 mm thick (seconds) | II. Without pre-activation (seconds) |
|---|---|---|
| Total travel time vs. main operation (within the assembly cycle) |  | 32 |
| B. Main cycle times (robot coupled) |  |  |
| Measuring of flange position by robot triggered by introduction and locking of body | 10 | 0 |
| Grasping of module, transfer | 5 | 5 |
| Position determination of flange upon approach | 0 | 4 |
| Position of the module on flange frame | 3 | 3 |
| Pressing module into opening and simultaneous inductive heating of flange | 27 | 17 |
| Robot to rest position | 3 | 3 |
| Total main cycle time | 48 | 32 |

EXAMPLE 1

400 g of a polyether diol with a mean molecular weight of 2000 g/mole are brought to react with 250 g of 4,4'-diphenylmethane diisocyanate and 0.4 g of diazobicyclooctane as a catalyst with one another at 70° C. for 2 hours in a 2 liter glass reactor with a nitrogen connection. Then 100 g of a crystalline softener, 33 g of a conventional softener and 600 g of a polyether triol with a mean molecular weight of 300 g/mole are added. The reaction mixture is stirred then for another 30 minutes at 60° C. Then the isocyanate-terminated prepolymer is degassed, mixed with nitrogen and stored in a closed container.

EXAMPLE 2

300 grams of a polypropylene oxide diol and 350 g of a polytetrahydrofuran diol in each case with a mean molecular weight of 2000 g/mole were caused to react with 480 g of 4,4'-diphenylmethane diisocyanate and 0.02 g of dibutyltin dilaurate (DBTL) as a catalyst at 70° C. for 2 h in a 2 liter reactor with a nitrogen connection. Then 290 g of a commercial softener and 50 g of a polyether triol with a mean molecular weight of 1000 g/mole were added. The reaction mixture was then stirred for another 45 minutes at the same temperature. Then the isocyanate-terminated prepolymer was degassed, mixed with nitrogen and stored in a closed container.

EXAMPLE 3

400 grams of a polyether diol with a mean molecular weight of 2000 g/mole were caused to react with 230 g of 4,4'-diphenylmethane diisocyanate and 0.03 g of dibutyltin dilaurate (DBTL) as a catalyst at 70° C. for 2 h in a 2 liter reactor with a nitrogen connection. Then 290 g of a commercial softener and 380 g of a polyether triol with a mean molecular weight of 3000 g/mole were added. The reaction mixture was then stirred for another 30 minutes at the same temperature. Then 50 g of an isocyanate terminated polyester prepolymer was added to the reaction mixture in a separate step and mixed at 60C. Finally the prepolymer was degassed, mixed with nitrogen and stored in a closed container.

EXAMPLE 4

235 wt. parts of a polypropylene oxide diol (OCZ 57) and 30 wt. parts of a polyester diol (OHZ 32) were reacted with one another at 70° C. for 2 hours in a 2 liter reactor with a nitrogen connection with 0.02 g of diazabicyclooctane as the catalyst. Then 382 wt. parts of a propylene oxide triol (OHZ 36) and 226 wt. parts of a commercial softener were added. The reaction mixture was then stirred for another 30 minutes at the same temperature. Then the isocyanate terminated prepolymer was degassed, mixed with nitrogen and stored in a closed container.

EXAMPLE 5

2000.0 g of isocyanate prepolymer of example 1 were warmed while stirring in a stream of nitrogen to 70–80° C. Then in nitrogen countercurrent, 82.1 g of the blocking agent p-hydroxybenzoate was added to the prepolymer. Then the reaction mixture was heated for 5 hours at this temperature until the NCO absorption band in the infrared spectrum (2250 $cm_{-1}$) had totally vanished. After the cooling of the mixture to room temperature the product was stored in a closed container.

EXAMPLE 6

2000.0 g of the isocyanate prepolymer of example 1 were warmed while stirring in a stream of nitrogen to 70° C. in a 2 liter glass reactor. Then 46.2 g of the blocking agent methylethyl ketoxime were added. The reaction mixture was held at this temperature for 0.5 h while stirred. The subsequent IR spectroscopic analysis showed the total disappearance of the IR absorption band. After the mixture was cooled to room temperature the product was stored in a closed container.

EXAMPLE 7

2000.0 g of the isocyanate prepolymer of example 1 was warmed to 70° C. while stirred in a stream of nitrogen in a 2 liter glass reactor. This was followed by the addition of 70.3 g of the blocking agent epsilon-caprolactam. Then the reaction was heated at 80° C. until the total disappearance of the NCO absorption band in the IR spectrum for 3 hours. After cooling to room temperature the blocked prepolymer was stored in a closed container.

EXAMPLE 8

300 g of p-hydroxybenzoate-blocked prepolymer from example 5 was heated to 50° C. in a 1 liter reactor. After ½ hour degassing of the prepolymer 0.2 wt. % of the deblocking catalyst dibutyltin dilaurate (DBTL) was added and the evacuation continued for 15 minutes. Then the product was filled into cartridges for storage.

EXAMPLE 9

300 g of methyl ethyl ketoxime-blocked prepolymer from example 6 were heated to 40° C. in a 1 liter reactor. After ½ hour degassing of the prepolymer, 0.2 wt. % of the catalyst blocked with formic acid was added and evacuation continued for 15 minutes. Then the product was filled into cartridges for storage.

EXAMPLE 10

300 g of the p-hydroxybenzoate-blocked prepolymer of example 5 were heated to 50° C. in a 1 liter reactor. After ½ hour of degassing of the prepolymer 1 g of trimethylol propane and 0.2 wt. % of the deblocking catalyst dibutyltin dilaurate (DBTL) were added and evacuation continued for 15 minutes. Then the product was filled into cartridges for storage.

EXAMPLE 11

300 g of the p-hydroxybenzoate-blocked prepolymer of example 5 were heated to 50° C. in 1 liter reactor. After ½ hour degassing of the prepolymer, 3 g of diethyltoluene diethylamine (DEDTA) were added and evacuation continued 15 minutes. Then the product was filled into cartridges for storage.

EXAMPLE 12

300 g of the p-hydroxybenzoate-blocked prepolymer of example 5 were heated to 50° C. in a 1 liter reactor. After ½ hour degassing of the prepolymer, 3.5 g of dicyanodiamide were added and evacuation continued for 15 minutes. Then the product was filled into cartridges for storage.

EXAMPLE 13

300 g of the p-hydroxybenzoate-blocked prepolymer of example 5 were heated to 50° C. in a 1 liter reactor. After ½ hour degassing of the prepolymer, 5 g of the phthalic acid anhydride/triethylene diamine adduct were added and evacuation continued for 15 minutes. Then the product was filled into cartridges for storage.

EXAMPLE 14

300 g of the p-hydroxybenzoate-blocked prepolymer of example 5 were heated to 50° C. in a 1 liter reactor. After ½ hour degassing of the prepolymer, 7.7 g of 4,4'-methylene dianiline/NaCl complex were added and evacuation continued for 15 minutes. Then the product was filled into cartridges for storage.

EXAMPLE 15

300 of g of epsilon caprolactam-blocked prepolymer from example 7 were heated to 50° C. in a 1 liter reactor. After ½ hour degassing of the prepolymer 7 g of 4,4'-diaminodicyclohexyl-methane were added and evacuation continued for 15 minutes. Then the product was filled into cartridges for storage.

EXAMPLE 16

300 g of the methylethyl ketoxim-blocked prepolymer of example 6 were heated to 50° C. in a 1 liter reactor. After ½ hour degassing of the prepolymer, 4.5 g of the methyl ethyl ketimine-blocked 4,4'-diaminodicyclohexylmethane were added and evacuation continued for 15 minutes. Then the product was filled into cartridges for storage.

EXAMPLE 17

The adhesive of example 10 was applied from a cartridge preheated to 60° C. in the form of an adhesive bead to a glass coated with primer. Then the bead was allowed to cool to room temperature. At this time it became solid and nontacky.

EXAMPLE 18

The bead of adhesive of example 10 applied to glass was stored at room temperature and normal air humidity for 1 month. During the storage no significant change in the consistency of the adhesive bead occurred.

EXAMPLE 19

20 wt. parts of a polypropylene oxide diol (OHZ 57) and 1.2 equivalent percent of the stabilizer ethylene diamine were mixed in a 1 liter reactor at room temperature. Then 10.5 wt. parts of TDIH were dispersed in and the entire mixture stirred for 1 hour. After addition of 0.4 wt. parts of DETDA and 40.6.wt. parts of jeffamine T5000 the mixture was degassed for 30 minutes. The 12 wt. parts of soot, 16 wt. parts of kaolin as a filler and 0.06 wt. parts of DBTL as a catalyst were added and the degassing continued for 30 minutes. Finally the product was filled into cartridges for storage.

EXAMPLE 20

5 wt. parts of a polyester polyol (OHZ 32) together with 40 wt. parts of a branched polyurethane polyether polyol (OHZ 30) were melted at 60° C. in a 1 liter reactor. After cooling to room temperature, 1 equivalent percent of JEFFAMINE D400 was added and then 11 wt. parts of TDIH dispersed in. After stirring for 1 hour 19.3 wt. parts of jeffamine D2000, 0.5 wt. parts of DETDA and 0.05 wt. parts of DBTL as a catalyst were added and degassing continued for 30 minutes. Then 5 wt. parts of soot, 6 wt. parts of carbosil TS 720 and 14 wt. parts of kaolin as fillers were introduced. The mixture was degassed for 30 minutes and filled into cartridges for storage.

Preparation of the Polyurethane Polyol 67.wt. parts of 4,4'-MDI, 250 wt. parts of a polypropylene oxide diol (OHZ 57), 24 wt. parts of a polypropylene oxide triol (OHZ 36), 433 wt. parts of trimethylol propane and 225 wt. parts of a commercially softener were weighed into a 2 liter reactor with a nitrogen fitting and heated to 70° C. After addition of 0.01 wt. % of tin octoate as a catalyst, the reaction mixture was stirred for 2 hours and filled for storage.

EXAMPLE 21

22 wt. parts of a polypropylene oxide triol (OHZ 36) with 4.3 equivalent percent of diethylene triamine were stirred at room temperature in a 1 liter reactor. Then 25 wt. parts of the pulverized IPDI trimer T1890 were dispersed in for 1 hour. This was followed by the addition of 18 wt. parts of jeffamine T5000 and 4 wt. parts of DETDA. After stirring for another 30 minutes 10 wt. parts of soot and 15 wt. parts of calcium carbonate were added as fillers and 0.05 wt. parts of DBTL as a catalyst. The mixture was degassed for 30 minutes and filled into cartridges for storage.

EXAMPLE 22

12.5 wt. parts of 4,4'-MDI, 22 wt. parts of polypropylene oxide diol (OHZ 57) and 43 wt. parts of a polypropylene oxide triol (OHZ 36) and 0.01 wt. parts of DBTL in 22.5 wt. parts of softener were reacted at 60° C. for 2 hours in a 2 liter reactor with a nitrogen fitting. This was followed by the addition of 0.05 wt. % of benzoquinone as a stabilizer. Then within 30 minutes 4 wt. parts of 2-hydroxyethylacrylate were added in drops. The reaction mixture was then stirred for another 15 minutes and degassed for 15 minutes. Since no NCO bands could be detected in IR spectrum any longer the product was filled into a container for storage.

EXAMPLE 23

12 wt. parts of 4,4'-MDI, 21 wt. parts of a polypropylene oxide diol (OHZ 57), 38 wt. parts of a polypropylene oxide triol (OHZ 36) and 0.01 grams of DBTL as catalyst were reacted for 2 hours at 60° C. in 22.5 wt. parts of softener in a 2 liter reactor. Then 5 wt. parts of an isocyanate-terminated polyester-prepolymer were melted into the reaction mixture. This was followed by the addition of 0.05 wt. parts of benzoquinone and 4.5 wt. parts of 2-hydroxyethylacrylate. The reaction mixture was stirred for 1 hour and degassed for 15 minutes. Then 5 wt. parts of soot, 6 wt. parts of HDK and 22 parts of talcum were mixed with the prepolymer, then it was degassed for 1 hour and filled into cartridges for storage.

EXAMPLE 24
(Warming in the C nv ction Oven)

The adhesive bead applied to the glass and stored at room temperature was heated for 10 minutes in a convection oven preheated to 150° C. After this time the temperature in the adhesive bead was 140° C. After this the adhesive bead was allowed to cool again. After 6 hours the adhesive had crosslinked.

EXAMPLE 25
(Ohmic Heating)

350 g of the blocked prepolymer of example 10 were mixed in a laboratory planetary mixer with 100 g of soot and 50 g of steel fibers (BEKI SHIELDS GR 90/C 03/5) in a vacuum for 1 hour at 50° C. The product was filled into aluminum cartridges. From this product a triangular bead 12 cm long was applied to a glass plate. At both ends an electrode 1 cm deep was pressed into the triangular bead. The two electrodes were connected to a DC or AC voltage source (0 to 250 V, 5 A). For 30 seconds an AC or DC voltage of 50 V was applied. After the current was switched off the temperature in the adhesive bead was measured with a thermal sensor (135° C. after 30 seconds at 50 V).

EXAMPLE 26
(Microwave Heating)

325 g of the blocked prepolymer of example 10 were mixed with 25 g of soot and 150 g of fillers for 1 hour at 50° C. in a vacuum in a laboratory planetary mixer. The product was filled into an aluminum cartridge. A 13 cm long triangular bead was applied from this product to a glass plate. The adhesive bead was irradiated in a microwave oven for 40 sec. at 1000 W power with microwaves. The bead temperature was measured with a fiber optic temperature measuring device and recorded with a flat bed recorder. After this microwave treatment 130° C. was measured in the adhesive bead.

EXAMPLE 27
(High Frequency Heating/tensile Test)

325 g of the blocked prepolymer of example 10 were mixed with 25 g of soot and 150 g of fillers for 1 hour at 50° C. in a vacuum in a laboratory planetary mixer. The product was filled into an aluminum cartridge. The adhesive was applied to a glass substrate (25×100×4 mm). The sample was treated in an HF system (27 MHz) for 30 sec. with a power of 100 W/g of adhesive. The temperature in the adhesive was measured with a fiber optic temperature measuring device and recorded with a flat bed recorder. After 30 seconds the temperature of 140° C. was measured in the adhesive.

EXAMPLE 28
(Induction Heating and Tensile Test)

323 g of the blocked prepolymer of example 10 were mixed with 25 g of filler and 150 g of ferrite powder (Ferritkerne N 27, ground) in a vacuum for 1 hour at 50° C. in a laboratory planetary mixer. The product was filled into an aluminum cartridge. With this product a 5 cm long triangular bead was applied to a glass plate. The glass plate with the triangular bead was placed in the center of an induction coil of 60 mm diameter which was connected to an induction generator of 3 kW power. The frequency of this device was ca. 200 kHz. The power of the installation was controlled by a microprocessor. The temperature curve was measured with a thermocouple and recorded with a flat bed recorder.

After 18 seconds of inductive heating 150° C. was measured. This temperature was maintained for another 30 seconds. 10 seconds after completion of the heating the adhesive-glass module was joined by means of a perforated diaphram (hole: size 50×20 mm) and a suitable apparatus to an enameled peel-off body (steel, 40×10×56 mm) in such a way that a glass-metal adhesion of 40×10×4 mm was formed. The material which bulged out was removed with 2 mm wide bent spatula.

Then the sample was exposed from the glass side by means of an induction coil to a magnetic induction field for 10 seconds. After the current source was switched off the adhesive had hardened. After conditioning for 24 hours at 23° C. and 50% relative humidity it was pulled on a tensile testing machine at a tension of 10 N and a speed of 400 mm/min. until it broke. A maximal force of 4.5 MPa was measured and a cohesive fracture was observed inside the bead of adhesive.

EXAMPLE 29

A triangular bead of the product of example 19 was applied to a glass plate. The glass plate with the triangular bead was irradiated with a short wave infrared source from. below. After 20 seconds, a temperature of 100° C. was measured at the base of the adhesive bead. After this time the base of the adhesive bead had hardened to a depth of ca. 1.5 mm while the upper part of the adhesive bead was soft and uncrosslinked. Approximately 10 seconds after the infrared heating source was turned off the adhesive was joined to a piece of steel overlapping in such a way that a tensile-shearing test piece with an overlap width of 10 mm and a layer thickness of 3 mm was created. The material which bulged out was removed with a 2 mm wide bent spatula. Then the sample was exposed for 7 seconds from the glass side to a magnetic induction field produced by an induction coil. After the current source was switched off the entire adhesive had hardened. After storage for 24 hours at 23° C. and 50% relative humidity the determination of the tensile shearing strength yielded a value of 3.5 MPa with a cohesive fracture inside the adhesive bead.

EXAMPLE 30

A triangular bead of the product of example 23 was applied to a glass plate. The glass plate with the triangular bead was irradiated with a short wave infrared source from below. After 30 seconds a temperature of 130° C. was measured at the base of adhesive bead. After this time the adhesive bead had hardened at the base to the depth of about 1 mm, while the upper part of the adhesive bead was soft and uncrosslinked. Approximately 10 seconds after the infrared heating source was switched off the adhesive was joined to a steel substrate in such a way that a tensile-shearing test piece with an overlap width of 10 mm and a layer thickness of 3 mm was created. The material bulging out was removed with a 2 mm wide bent spatula. Then the sample was exposed from the glass side to a magnetic induction field generated by an induction coil for 7 seconds. After the current source was switched off the adhesive had hardened.

EXAMPLE 31
(References Example)

The test from example 29 was repeated but without irradiation with the infrared source. After heating for 15 seconds by

What is claimed is:

1. Storable modular component comprising a modular component and a profiled strip of adhesive of a latently reactive adhesive disposed along the edge of the modular component which adhesive comprises:
   one or more polyurethanes with blocked isocyanate groups;
   one or more polyurethane prepolymers consisting of polyols and/or polyamines and encapsulated polyisocyanates; or
   one or more polyurethane prepolymers with radically polymerizable groups;
wherein the adhesive strip at ambient temperature is solid and does not deform when handled; has a softening point at a temperature of 70° C. to 180° C.; and has a softening point at a temperature of 25° C. to 80° C. wherein the adhesive strip is tacky and non-flowing and plastically deformable for a time sufficient for assembly and the modular component can be stored for 1 to 3 months.

2. A storable module according to claim 1 wherein the modular component comprises a glass pane wherein the profiled adhesive strip lies directly on the edge of the glass pane or on a separate intermediate support wherein the glass pane is adapted to be glued into a frame or flange.

3. A storable module according to claim 9 wherein the difference between the softening point and the activation temperature of the adhesive is at least 20° C.

4. A storable module according to claim 2 wherein the adhesive is cured along its contact surface with the modular component.

5. A storable module according to claim 4 wherein the adhesive is solid at room temperature and has a softening point of about 25° C. to about 80° C. and about 5 to about 15 weight percent of the polyols serving to construct the
   polyurethanes are polyester polyols, while the remainder are polyether polyols.

6. A storable modular component according to claim 4 wherein the difference between the softening point and the activation temperature is at least about 20° C.

7. A storable module according to claim 6 wherein the isocyanate groups are blocked by phenol, ketoxime or epsilon-caprolactam compounds;
   the adhesive additionally contains low molecular H-active polyfunctional compounds or latent amine hardeners; and
   organometal compounds or tertiary amines as catalysts.

8. A storable module according to claim 4 wherein the adhesive comprises polyurethanes with blocked isocyanate groups.

9. A storable module according to claim 4 wherein the adhesive comprises one or more polyurethanes with acrylate or methacrylate end groups and contains the additives necessary for initiation and control of the radical polymerization.

10. A storable module according to claim 4 wherein the adhesive comprises polyurethane preproducts whose isocyanates are low molecular solid compounds which are protected by a shell of urea.

11. A storable module according to claim 9 wherein at least one black essentially light impermeable coating is arranged between the glass and the adhesive strip.

* * * * *